(12) United States Patent  
Fan

(10) Patent No.: US 9,357,458 B2  
(45) Date of Patent: May 31, 2016

(54) DISTRIBUTED METHOD FOR CLIENT OPTIMIZATION

(71) Applicant: Aruba Networks, Inc., Sunnyvale, CA (US)

(72) Inventor: Jitao Fan, Beijing (CN)

(73) Assignee: ARUBA NETWORKS, INC., Sunnyvale, CA (US)

(*) Notice: Subject to any disclaimer, the term of this patent is extended or adjusted under 35 U.S.C. 154(b) by 77 days.

(21) Appl. No.: 14/266,064

(22) Filed: Apr. 30, 2014

(65) Prior Publication Data

US 2015/0319657 A1 Nov. 5, 2015

(51) Int. Cl.
*H04W 4/00* (2009.01)
*H04W 36/08* (2009.01)
*H04W 36/16* (2009.01)
*H04W 36/20* (2009.01)

(52) U.S. Cl.
CPC ............ *H04W 36/08* (2013.01); *H04W 36/165* (2013.01); *H04W 36/20* (2013.01)

(58) Field of Classification Search
CPC ... H04W 36/08; H04W 36/165; H04W 36/20; H04W 36/0005; H04W 36/24; H04W 36/34; H04W 36/16; H04W 36/38
USPC .......................................................... 370/332
See application file for complete search history.

(56) References Cited

U.S. PATENT DOCUMENTS

| | | | | |
|---|---|---|---|---|
| 7,606,573 B1 * | 10/2009 | Vacon | ................ | H04W 16/10 370/329 |
| 8,867,342 B2 * | 10/2014 | Mathur | ................ | H04W 24/02 370/229 |
| 2006/0193299 A1 * | 8/2006 | Winget | ............... | H04L 63/0492 370/338 |
| 2008/0008147 A1 * | 1/2008 | Nakayama | .......... | H04W 72/082 370/338 |
| 2008/0130598 A1 * | 6/2008 | Kalhan | ................. | H04W 64/00 370/338 |
| 2012/0021788 A1 * | 1/2012 | Yavuz | ................... | H04W 36/30 455/501 |
| 2012/0033572 A1 * | 2/2012 | Bamberger | ........... | G01S 5/0081 370/252 |
| 2012/0155426 A1 * | 6/2012 | Verma | ............... | H04W 36/0033 370/331 |
| 2012/0250657 A1 * | 10/2012 | Zhou | ..................... | H04W 12/06 370/331 |
| 2013/0022035 A1 * | 1/2013 | Ling | .................. | H04W 72/1247 370/345 |
| 2015/0133142 A1 * | 5/2015 | Lee | ...................... | H04W 72/046 455/452.2 |
| 2015/0163723 A1 * | 6/2015 | Pandey | ................. | H04W 16/10 370/252 |
| 2015/0245280 A1 * | 8/2015 | Zhou | ..................... | H04W 36/32 455/434 |
| 2015/0249954 A1 * | 9/2015 | Patil | ..................... | H04W 48/16 370/338 |

* cited by examiner

*Primary Examiner* — Chi H Pham
*Assistant Examiner* — Robert Lopata
(74) *Attorney, Agent, or Firm* — Mannava & Kang, P.C.

(57) ABSTRACT

The present disclosure discloses a distributed method and network device for providing client optimization in WLANs. Specifically, a first access point detects a plurality of client devices. The first access point also receives information identifying a first set of client devices associated with the second access point. Then first access point then identifies a subset of the detected plurality of client devices that are also identified in the first set of client devices associated with the second access point. Finally, the first access point transmits to the second access point characteristics corresponding to the subset of the plurality of client devices. The characteristics are determined based on wireless signals received by the first access point from the subset of the plurality of client devices.

20 Claims, 10 Drawing Sheets

AP₁ VBR 340

| CLIENT 300 | AP 310 | ASSOCIATED? 320 | SIGNAL STRENGTH 330 |
|---|---|---|---|
| CLIENT₁ | AP₁ | YES | 32 |
| | AP₂ | NO | 26 |
| CLIENT₂ | AP₁ | YES | 17 |
| | AP₂ | NO | 38 |
| CLIENT₃ | AP₁ | YES | 29 |
| | AP₃ | NO | 26 |
| CLIENT₄ | AP₁ | NO | 33 |
| | AP₂ | YES | 28 |

FIG. 3A

AP₂ VBR 350

| CLIENT 300 | AP 310 | ASSOCIATED? 320 | SIGNAL STRENGTH 330 |
|---|---|---|---|
| CLIENT₁ | AP₁ | YES | 32 |
|  | AP₂ | NO | 26 |
| CLIENT₂ | AP₁ | YES | 17 |
|  | AP₂ | NO | 38 |
| CLIENT₄ | AP₁ | NO | 33 |
|  | AP₂ | YES | 28 |
| CLIENT₅ | AP₂ | YES | 31 |

FIG. 3B

AP₃ VBR 360

DISTRIBUTED METHOD FOR CLIENT OPTIMIZATION

FIELD

The present disclosure relates to client management in a wireless local area network (WLAN). In particular, the present disclosure relates to an improved mechanism for providing distributed client optimization in a WLAN.

BACKGROUND

Wireless digital networks, such as networks operating under the current Electrical and Electronics Engineers (IEEE) 802.11 standards, are spreading in their popularity and availability. In a typical WLAN environment, a client device will select one of the access points (APs) in the WLAN to associate with. Generally, the client device will select the AP from which the client device receives a signal with strongest signal strength compared with signals received from other APs in the WLAN.

Such selection usually works well for the first time when the client device joins the WLAN. However, as time progresses, some events may lead to this initial selection of AP by the client device no longer being an optimal selection. For example, the client device may roam to a new location that is far away from the AP. As another example, the AP may have been overloaded with too many other client devices. As yet another example, the wireless channel on which the client device communicates with the AP may be experiencing significant interference or noises. Usually when such events happen, the client device would start to experience poor network connectivity. However, the client device may be unwilling or unable to disassociate with the initial AP and associate with a new AP in the WLAN responsive to such events. Note that, when a client device selects a sub-optimal AP, the poor selection not only affects the client device's own network connectivity, but also affect the AP's performance and other client the network connectivity of other client devices in the WLAN.

In a centralized system, a central network controller device could help the client device select an optimal AP and instruct to the APs to facilitate the client device to be connected with the selected AP. However, in a distributed system where there is no centralized network control device, there are at least two problems that prevent an AP from helping the client device to select an optimal AP in the WLAN. First, a "thin" AP has limited computational resource, and mainly forwards packets between wireless and wired networks. Thus, a "thin" AP is unable to help the client to select an optimal AP.

Second, a "fat" AP, on the other hand, can provide much broad functionality. One of multiple "fat" APs from an AP cluster may be self-elected as a master AP to provide network management of other APs (hereinafter referred to as "slave APs") in the same cluster of APs. Nevertheless, a slave AP often does not communicate with a master AP before a client device completes the association phrase. Thus, the slave AP may only communicate with the master AP after the client device is already connected with the WLAN. Therefore, the master AP has limited ability to influence the slave AP on the optimal AP selection for the client device due to this lack of communication during client device association and authentication process. Hence, it is desirable to have a lightweight solution that allows an AP to help the client select an optimal AP to connect in a distributed WLAN system.

BRIEF DESCRIPTION OF THE DRAWINGS

The present disclosure may be best understood by referring to the following description and accompanying drawings that are used to illustrate embodiments of the present disclosure.

FIGS. 3A-3C illustrate exemplary virtual beacon report (VBR) maintained at different access points according to embodiments of the present disclosure.

DETAILED DESCRIPTION

In the following description, several specific details are presented to provide a thorough understanding. While the context of the disclosure is directed to client management in WLANs, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to client management in a wireless local area network (WLAN). In particular, the present disclosure relates to an improved mechanism for providing distributed client optimization in WLANs.

With the solution provided herein, a disclosed first access point detects a plurality of client devices, and receives information identifying a first set of client devices associated with a second access point. The first access point also identifies a subset of the detected plurality of client devices that are also identified in the first set of client devices associated with the second access point. Then, the first access point transmits, to the second access point, characteristics corresponding to the subset of the plurality of client devices. Note that, the characteristics is determined based on wireless signals received by the first access point from the subset of the plurality of client devices.

According to some embodiments of the present disclosure, a disclosed second access point transmits, to a first access point, information identifying a plurality of client devices associated with the second access point. The second access point also receives, from the first access point, characteristics associated with at least one client device in the plurality of client devices. Here, the characteristics is determined by the second access point based on wireless signals received by the second access point from the at least one client device. Further, the second access point selects a particular access point for providing network access to the at least one client device based at least on the characteristics received from the first access point.

Computing Environment

Figure 1:
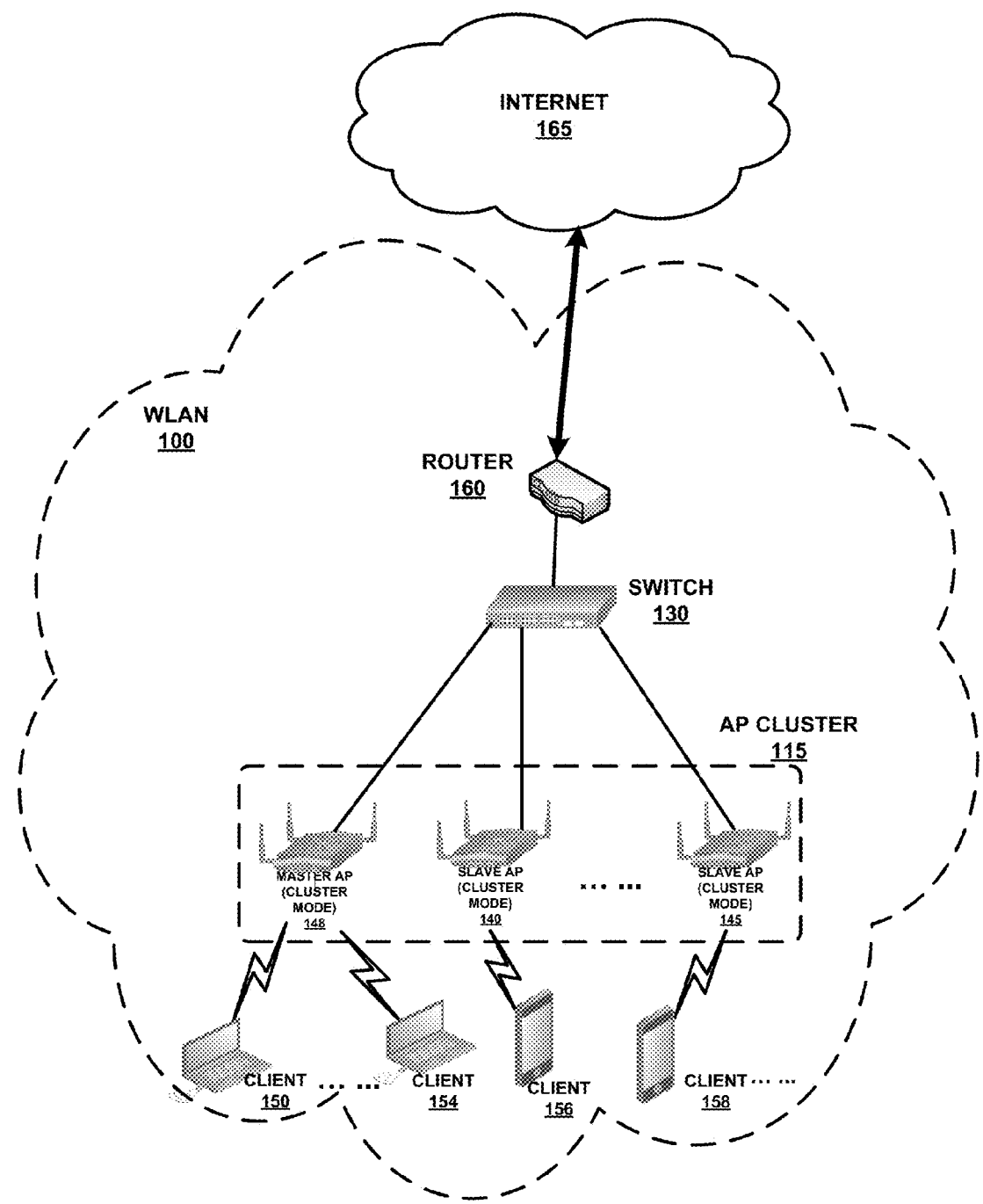
FIG. 1 shows exemplary computing environment according to embodiments of the present disclosure.

FIG. 1 shows exemplary computing environment according to embodiments of the present disclosure. Specifically, as illustrated in FIG. 1, a WLAN 100 includes a router 160, a switch 130, a number of access points (APs) (such as, AP 140, AP 145, AP 148 etc.) deployed in cluster mode as an AP cluster 115, a number of client devices (such as, client device 150, client device 154, client device 158, etc.), and so on. Note that, WLAN 100 does not include any centralized network controller device. Rather, the APs in AP cluster 115 self-elect a master AP, which can manage the configurations for one or more other APs (hereinafter referred to as slave APs). Here, it is assumed that AP 148 is self-elected as master AP to manage slave APs 140-145.

Moreover, in the exemplary network depicted in FIG. 1, a number of client devices are connected to the access points in WLAN 100. For example, client devices 150-154 are associated with master AP 148, client device 156 is associated with slave AP 140; and, client devices, such as client device 158, are associated with AP 145. Note that, client devices may be connected to the access points via wired or wireless connections.

During operations, a wireless station, such as client device 150, client device 154, client device 156, or client device 158, will initially transmit an association request over the air. Any AP in the physical neighborhood of the wireless station can respond with an association response. Based on the signal strength of a signal received from the neighboring APs, the wireless station selects an AP to complete association process. Once the wireless station is associated with a respective access point (e.g., AP 140, AP 145, AP 148, etc.), because the APs are deployed in the cluster mode, a slave AP that a client device is connected to will forward all network packets originated from the client device on a native VLAN to the master AP via an upstream switch. Each AP is connected to an upstream switch via one or more ports.

Moreover, each AP in AP cluster 115 may periodically collect information from client devices of WLAN 100, and share the collected information with each other by propagating the information using broadcast or multicast messages. From the propagated information about a particular client device, a respective AP will learn the client device information from other APs' perspectives. Such client device information may include, for example, whether another AP in AP cluster 115 can hear the signal transmitted from the particular client device; what the received signal strength associated with a signal from the particular client device is at another AP; etc. The associated AP and/or the master AP can then determine whether to move a particular client device to associate with another AP based on the client device information as perceived by all APs in AP cluster 115 combined with network device information. The network device information includes, but is not limited to, network load, channel interference, channel utilization, different APs' differentiated capabilities, etc.

Moreover, the associated AP and/or the master AP can further determine a new AP in AP cluster 115 the particular client device should be associated with. This decision will then be propagated among all APs in AP cluster 115. If all APs agree to the decision, the particular client device will be moved to associate with the new AP, for example, through a de-authorization process from the associated AP followed by a re-association process with the new AP.

Network according to embodiments of the present disclosure may operate on a private network including one or more local area networks. The local area networks may be adapted to allow wireless access, thereby operating as a wireless local area network (WLAN). In some embodiments, one or more networks may share the same extended service set (ESS) although each network corresponds to a unique basic service set (BSS) identifier.

In addition, network depicted in FIG. 1 may include multiple network control plane devices, such as network controllers, access points or routers capable of controlling functions, etc. Each network control plane device may be located in a separate sub-network. The network control plane device may manage one or more network management devices, such as access points or network servers, within the sub-network.

Distributed Client Optimization

According to embodiments of present disclosure, multiple APs are deployed in a network environment. The multiple APs collaboratively provide network access to client devices of a WLAN. To allow for distributed client optimization, each AP needs to learn information about a particular client device from all other APs in an AP cluster. In other words, for a particular client device, each AP directly collects a different set of client information. If the APs can share with each other the different set of client information, the all APs in the AP cluster will have the same set of client information pertaining to a particular client device. Based on this uniform set of client information, the APs can determine which AP is the best AP for the particular client device to associate with in the WLAN. If it is determined that the particular client device shall be moved to associate with a new AP, the APs can then propagate such decision in the AP cluster. Upon agreement from all neighboring APs to the particular client device, the move decision will be executed, for example, by a de-authorization process from the current AP followed by an association process with the new AP. Hence, in generally, distributed client optimization involves at least four basic components: collecting information; making decision; propagating decision; and executing decision. Each of the basic components is described in the following sections in details.

A. Collecting Information

Figure 2A:
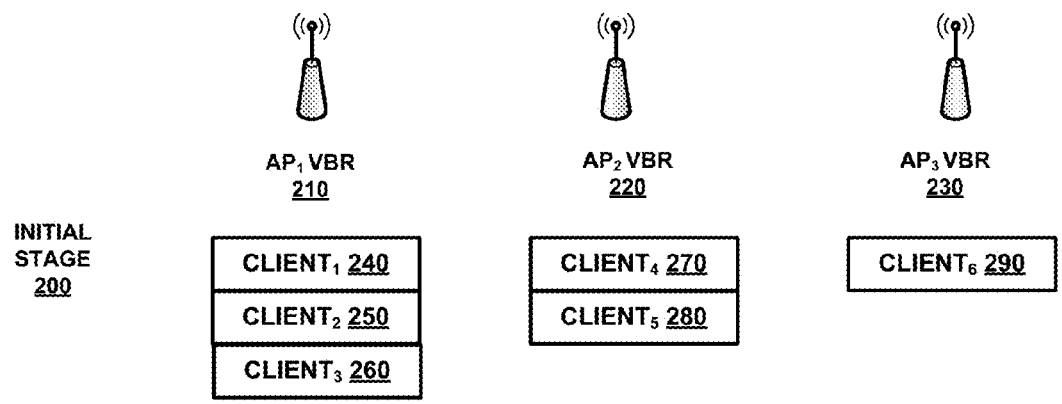
FIGS. 2A-2B illustrate exemplary AP states before and after propagation according to embodiments of the present disclosure.

The first basic component of distributed client optimization is for each AP to complete information collection. Each AP maintains a virtual beacon report (VBR), which in its initial stage, includes only the client devices that are associated with a respective AP. Referring now to FIG. 2A, at initial stage 200, the system includes at least three APs, namely $AP_1$, $AP_2$, and $AP_3$. Furthermore, because $client_1$ 240, $client_2$ 250, $client_3$ 260 are initially associated with $AP_1$, $AP_1$ VBR 210 includes at least three entries corresponding to $client_1$ 240, $client_2$ 250, $client_3$ 260 respectively. Also, because $client_4$ 270 and $client_5$ 280 are initially associated with $AP_2$, $AP_2$ VBR 220 includes at least two entries corresponding to $client_4$ 270 and $client_5$ 280 respectively. Likewise, because $client_6$ 290 is initially associated with $AP_3$, $AP_3$ VBR 230 includes at least one entry corresponding to $client_6$ 290. During this initial stage, each AP will only announce the list of client devices that are associated with each AP to other APs in the WLAN.

Figure 2B:
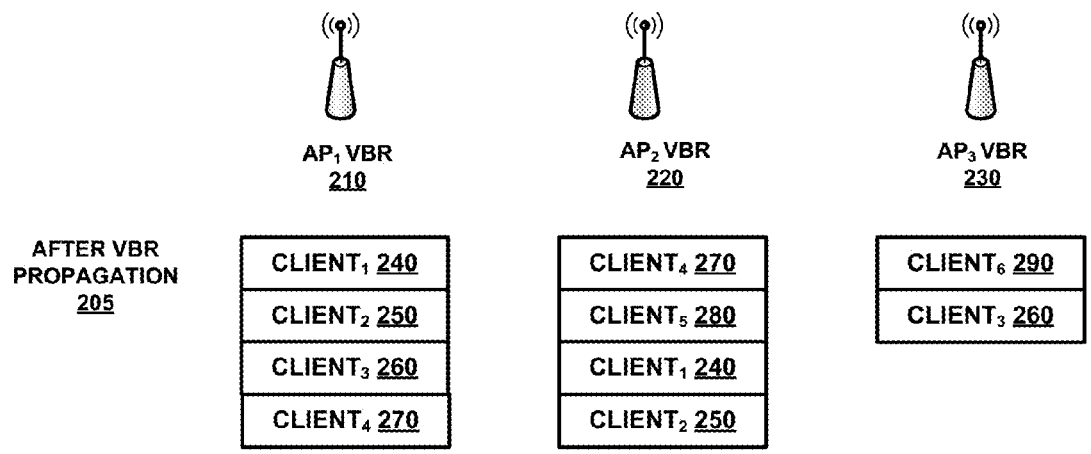

FIG. 2B shows the state of the system after VBR propagation 205. In this example, assuming that $AP_1$ can also receive frames from $client_4$ 270; $AP_2$ can also receive frames from $client_1$ 240 and $client_2$ 250; and, $AP_3$ can also receive frames from $client_3$ 260. Moreover, assuming that, $AP_1$, $AP_2$, and $AP_3$ are deployed within the same physical neighborhood, and thus can hear the VBR announcement from each other.

In general, during VBR propagation, when an AP receives a VBR announcement from a neighboring AP, the AP will compare the client list in the announcement frame with the list of clients that the AP can hear itself. If the AP can hear from a client appearing in a client list obtained from a neighboring AP's VBR announcement, the AP will add the client information from the neighboring AP's VBR announcement frame.

For example, $AP_1$ may receive the VBR announcement frame including information of $client_4$ 270 and $client_5$ 280 from $AP_2$. Because $AP_1$ can hear $client_4$ 270, $AP_1$ will copy $client_4$ 270's information from $AP_2$'s announcement frame to $AP_1$'s own VBR. On the other hand, because $AP_1$ cannot hear $client_5$ 280, $AP_1$ will not copy $client_5$ 280's information from $AP_2$'s announcement frame to $AP_1$'s own VBR. Also, $AP_1$ may receive the VBR announcement including information of $client_6$ 290 from $AP_3$. Because $AP_1$ cannot hear $client_6$ 290, $AP_1$ will not copy $client_6$ 290's information from $AP_3$'s announcement frame to $AP_1$'s own VBR. Thus, after VBR propagation 205, $AP_1$'s VBR 210 will include $client_1$ 240 (associated client), $client_2$ 250 (associated client), $client_3$ 260 (associated client), and $client_4$ 270 (client associated with $AP_2$ whose information copied from $AP_2$'s VBR announcement frame).

As another example, $AP_2$ may receive the VBR announcement frame including information of $client_1$ 240, $client_2$ 250, and $client_3$ 260 from $AP_1$. Because $AP_2$ can hear $client_1$ 240 and $client_2$ 250, $AP_2$ will copy information regarding $client_1$ 240 and $client_2$ 250 from $AP_1$'s announcement frame to $AP_2$'s own VBR. On the other hand, because $AP_2$ cannot hear $client_3$ 260, $AP_2$ will not copy $client_3$ 260's information from $AP_1$'s announcement frame to $AP_2$'s own VBR. Also, $AP_1$ may receive the VBR announcement including information of $client_6$ 290 from $AP_3$. Because $AP_2$ cannot hear $client_6$ 290, $AP_2$ will not copy $client_6$ 290's information from $AP_3$'s announcement frame to $AP_2$'s own VBR. Thus, after VBR propagation 205, $AP_2$'s VBR 220 will include $client_4$ 270 (associated client), $client_5$ 280 (associated client), $client_1$ 240 (client associated with $AP_1$ whose information copied from $AP_1$'s VBR announcement frame), and $client_2$ 250 (client associated with $AP_1$ whose information copied from $AP_1$'s VBR announcement frame).

Likewise, $AP_3$ may receive the VBR announcement frame including information of $client_1$ 240, $client_2$ 250, and $client_3$ 260 from $AP_1$. Because $AP_3$ can hear $client_3$ 260, $AP_3$ will copy information regarding $client_3$ 260 from $AP_1$'s announcement frame to $AP_3$'s own VBR. On the other hand, because $AP_3$ cannot hear $client_1$ 240 and $client_2$ 250, $AP_2$ will not copy information of $client_1$ 240 and $client_2$ 250 from $AP_1$'s announcement frame to $AP_3$'s own VBR. Also, $AP_3$ may receive the VBR announcement including information of $client_4$ 270 and $client_5$ 280 from $AP_2$. Because $AP_3$ cannot hear $client_4$ 270 and $client_5$ 280, $AP_3$ will not copy information of $client_4$ 270 and $client_5$ 280 from $AP_2$'s announcement frame to $AP_3$'s own VBR. Thus, after VBR propagation 205, $AP_3$'s VBR 230 will include $client_6$ 290 (associated client), and $client_3$ 260 (client associated with $AP_1$ whose information copied from $AP_1$'s VBR announcement frame).

In some embodiments, for a client that are associated with a current AP, if the client is also heard at a different AP in the AP cluster, the current AP will insert a corresponding entry and copy the information heard at the different AP from the VBR announcement frame received from the different AP.

In some embodiments, for a client that is heard at a current AP but not associated with the current AP, if the client is associated with a different AP in the AP cluster, the current AP will insert a corresponding entry and copy the information heard at the client's associated AP from the VBR announcement frame received from the different AP.

In some embodiments, the client information propagation can be performed iteratively among the APs in the AP cluster until no AP has any more updates to its VBR. In some embodiments, the VBR is maintained only for the associated clients. If a particular client disassociates with the WLAN, the client is removed from the VBRs at all APs.

In some embodiments, the VBR is updated in response to a change in the signal strength associated with a wireless signal received from a particular client device. In some embodiments, the updated VBR will not be propagated to the AP's neighboring APs until a triggering event occurs or a predetermined fixed interval expires.

In some embodiments, each AP will add some additional information to the VBR announcement frame before broadcasting the frame to the WLAN. The additional information may include, but is not limited to, the AP's own identifier (e.g., the AP's Media Access Control (MAC) address).

In some embodiments, each AP may broadcast the VBR announcement frame periodically at a fixed interval, which can be configured by a network administrator. A default interval, e.g., 30 seconds, can be set without any input from the network administrator. In some embodiments, an AP may broadcast the VBR announcement frame in response to a triggering event. The triggering event may include, but is not limited to, a new client device associating with the AP.

Here, an AP is said to be able to "hear" a client device, if the AP can receive a broadcast or multicast wireless frame from the client device that is not associated with the AP. Note that, a client, a client device, a wireless station, and/or a station are used interchangeable in the present disclosure.

B. Making Decision

Figure 3C:

FIGS. 3A-3C illustrate exemplary virtual beacon report (VBR) maintained at different access points according to embodiments of the present disclosure. Specifically, FIG. 3A illustrates $AP_1$'s VBR 340 after VBR propagation. $AP_1$'s VBR 340 includes at least a field for client identifiers (client 300), a field for AP identifiers (AP 310), a field for association status (associated? 320), and a field for signal strength (signal strength 330).

After VBR propagation, $AP_1$ has four clients in its VBR 340, namely $client_1$, $client_2$, $client_3$, and $client_4$. For $client_1$, the corresponding $AP_1$'s VBR entries indicate that $client_1$ is associated with $AP_1$ and the signal strength of a signal from $client_1$ heard at $AP_1$ is 32 dB; and, $client_1$ is not associated with $AP_2$ but can be heard at $AP_2$ and the signal strength of a signal from $client_1$ heard at $AP_2$ is 26 dB. For $client_2$, the corresponding $AP_1$'s VBR entries indicate that $client_2$ is associated with $AP_1$ and the signal strength of a signal from $client_2$ heard at $AP_1$ is 17 dB; and, $client_2$ is not associated with $AP_2$ but can be heard at $AP_2$ and the signal strength of a signal from $client_2$ heard at $AP_2$ is 38 dB. For $client_3$, the corresponding $AP_1$'s VBR entries indicate that $client_3$ is associated with $AP_1$ and the signal strength of a signal from $client_3$ heard at $AP_1$ is 29 dB; and that $client_3$ is not associated with $AP_3$ but can be heard at $AP_3$ and the signal strength of a signal from $client_3$ heard at $AP_3$ is 26 dB. For $client_4$, the corresponding $AP_1$'s VBR entries indicate that $client_4$ is not associated with $AP_1$ but can be heard at $AP_1$ and the signal strength of a signal from $client_4$ heard at $AP_1$ is 33 dB; and, $client_4$ is associated with $AP_2$ and the signal strength of a signal from $client_4$ heard at $AP_2$ is 28 dB.

Referring now to FIG. 3B, $AP_2$'s VBR 350 includes at least a field for client identifiers (client 300), a field for AP identifiers (AP 310), a field for association status (associated? 320), and a field for signal strength (signal strength 330). After VBR propagation, $AP_2$ has four clients in its VBR 350, namely $client_1$, $client_2$, $client_4$, and $client_5$. For $client_1$, the corresponding $AP_1$'s VBR entries indicate that $client_1$ is associated with $AP_1$ and the signal strength of a signal from $client_1$ heard at $AP_1$ is 32 dB; and, $client_1$ is not associated with $AP_2$ but can be heard at $AP_2$ and the signal strength of a signal from $client_1$ heard at $AP_2$ is 26 dB. For $client_2$, the corresponding $AP_2$'s VBR entries indicate that $client_2$ is associated with $AP_1$ and the signal strength of a signal from $client_2$ heard at $AP_1$ is 17 dB; and, $client_2$ is not associated with $AP_2$ but can be heard at $AP_2$ and the signal strength of a signal from $client_2$ heard at $AP_2$ is 38 dB. For $client_4$, the corresponding $AP_2$'s VBR entries indicate that $client_4$ is not associated with $AP_1$ but can be heard at $AP_1$ and the signal strength of a signal from $client_4$ heard at $AP_1$ is 33 dB; and, $client_4$ is associated with $AP_2$ and the signal strength of a signal from $client_4$ heard at $AP_2$ is 28 dB. For $client_5$, the corresponding $AP_2$'s VBR entries indicate that $client_3$ is associated with $AP_2$ and the signal strength of a signal from $client_3$ heard at $AP_2$ is 31 dB.

Referring now to FIG. 3C, $AP_3$'s VBR 360 includes at least a field for client identifiers (client 300), a field for AP identifiers (AP 310), a field for association status (associated? 320), and a field for signal strength (signal strength 330). After VBR propagation, $AP_3$ has two clients in its VBR 360, namely $client_3$ and $client_6$. For $client_3$, the corresponding $AP_3$'s VBR entries indicate that $client_3$ is associated with $AP_1$ and the signal strength of a signal from $client_3$ heard at $AP_1$ is 29 dB; and that $client_3$ is not associated with $AP_3$ but can be heard at $AP_3$ and the signal strength of a signal from $client_3$ heard at $AP_3$ is 26 dB. For $client_6$, the corresponding $AP_3$'s VBR entries indicate that $client_6$ is associated with $AP_3$ and the signal strength of a signal from $client_3$ heard at $AP_3$ is 32 dB.

Note that, for each client device, the information maintained at different APs in the AP cluster is identical after the client information collection and propagation complete at each AP, because the propagation of VBRs is limited to client devices that are associated with each AP or associated with its neighboring APs. In other words, if a particular AP only hears a client, but the client does not appear in any of the VBRs received from other neighboring APs, then the client's information will not be included in the particular AP's VBR.

The uniform post-propagation VBR information per client allows the APs to make decisions regarding which AP is the best AP for a particular client to associate without assistance from a centralized controller device. In some embodiments, the decision can be made at, for example the current AP with which the particular client device is associated. Thus, in this example, $AP_1$ will make decisions for $client_1$, $client_2$, and $client_3$; $AP_2$ will make decisions for $client_4$ and $client_5$; and $AP_3$ will make decision for $client_6$.

More specifically, because in $AP_1$'s VBR 340, for $client_2$ that is associated with $AP_1$, the signal strength of a signal from $client_2$ received at $AP_1$ is 17 dB, whereas the signal strength of a signal from $client_2$ received at $AP_2$ is 38 dB. Because $AP_2$ hears a stronger signal from $client_2$ than $AP_1$, $AP_1$ will decide that $AP_2$ is a better AP than itself for $client_2$ to be associated with.

Note that, although only signal strength is used in the illustrated example, other parameters can be collected, shared, and propagated by the APs in the AP cluster to facilitate the decision-making as well. Such parameters may include, but are not limited to, the number of times that a particular client has been triggered to be moved to another AP in the past; the application type associated with the particular client (e.g., whether the client is using a voice application); the number of successful client moves in the past; the device type associated with the particular client (e.g., whether the client device is an Apple® device); the platform and/or operating system associated with the particular client (e.g., whether the client uses an iOS platform); the status of the particular client (whether associated with the current AP or associated with a neighboring AP but heard by the current AP); etc.

Various policies can be applied to the parameters to determine whether a particular client device should be moved to associate with a new AP in the AP cluster. First, if a client is "sticky" to the AP such that, even if the client is experiencing poor received signal strength indicator (RSSI) for the connection with the AP, the client does not disassociate with the AP. If an AP observes a "sticky" client from the VBR, the AP will trigger the client to move to a new AP with a better RSSI.

Second, the AP can trigger a client move to another AP to achieve spectrum load balance. For example, one particular channel from multiple channels in a WLAN is busy with a large number of associated clients with a first AP communicating on the particular channel. On the other hand, a second AP may communicate on a different channel, whereas only a small number of associated clients communicating on the different channel. Thus, the first AP may trigger a move for one or more of its clients to change to associate with the second AP on the different channel. This change may improve the performance of the entire spectrum due to more balanced channel load across the spectrum.

Third, the AP can trigger a client move to another AP to achieve a band steering effect. Specifically, there are two bandwidths that are often used in WLAN, namely, the 2.4 GHz band and the 5 GHz band. Because interference more often exist in the 2.4 GHz band than the 5 GHz band, if a client has dual-band capability to operate on both the 2.4 GHz and the 5 GHz bands, the AP may trigger a move for the client to associate with a new AP on a different and better band with less interferences.

Fourth, the AP can trigger a client move to another AP to achieve good channel utilization. For example, one particular channel from multiple channels in a WLAN is busy with high channel utilization rate (e.g., 99%). Note that, the channel may have a high channel utilization rate with only a few clients communicating on the channel. On the other hand, a second AP may communicate on a different channel, whereas the channel utilization rate associated with the different channel is quite low (e.g., 10%). Thus, the first AP may trigger a move for one or more of its clients to change to associate with the second AP on the different channel.

Finally, the AP can trigger a client move to another AP to match the client's capability with the AP's capability. For example, the APs can be divided into four categories: (1) APs in compliance with IEEE 802.11a/b/g standard protocols; (2) APs in compliance with IEEE 802.11n standard protocol; and (3) APs in compliance with IEEE 802.11ac standard protocol. Moreover, the clients can be divided into multiple categories as well based on characteristics of the clients and/or channels that they communicate on: (1) 20 MHz channels, (2) 40 MHz channels, and (3) 80 MHz or 160 MHz channels. Thus, the first AP may trigger a move for a client capable of communicating on 80 MHz or 160 MHz channels to associate with an AP capable of supporting IEEE 802.11ac standard.

C. Propagating Decision

Figure 4:
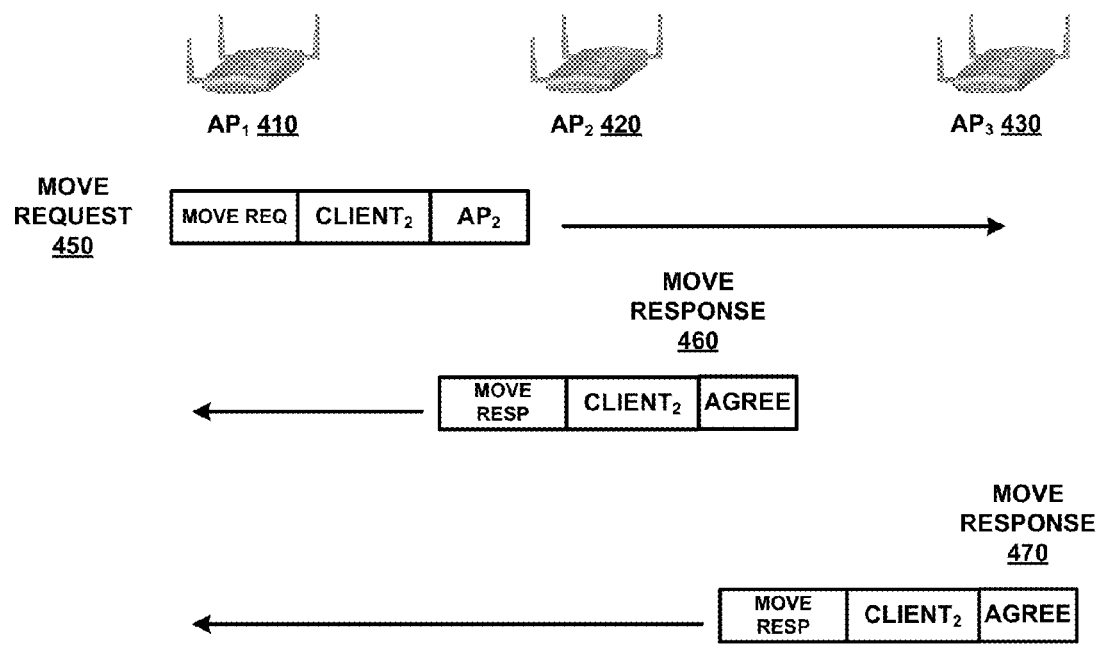
FIG. 4 illustrates exemplary communication exchanges between access points during decision propagation according to embodiments of the present disclosure.

FIG. 4 illustrates an exemplary decision propagation process according to embodiments of the present disclosure. FIG. 4 includes $AP_1$ 410, $AP_2$ 420, and $AP_3$ 430 that are physically located in the same neighborhood, such that the APs can hear broadcast or multicast messages transmitted from each other. In the illustrated example, AP1 determines that client2 should be moved to associate with $AP_2$. Thus, AP1 will send an adoption request message (e.g., move request 450). The adoption request message includes at least a message type (e.g., move request), a client identifier (e.g., $client_2$) identifying the client requested to be moved to a new AP from the message sender, and an AP identifier (e.g., $AP_2$) identifying the target AP for the requested client to move to. The adoption request message (e.g., move request 450) will be broadcasted in the WLAN, and thus be heard by $AP_2$ 420 and $AP_3$ 430.

Each neighboring AP will transmit an adoption response message (e.g., move response 460, move response 470) in response to receiving the adoption request message. The adoption response message may include at least a type of message (e.g., move request), a client identifier (e.g., $client_2$) identifying the client requested to be moved to a new AP from the message sender, and a vote identifying whether the sender of the adoption response message agrees to moving the client to the target AP as requested in the adoption request message. Note that, the adoption response message can be transmitted as either a broadcast message or a unicast message destined to the sender of the adoption request message.

For a non-target AP, such as $AP_3$ 430, the AP will typically transmit message indicating a vote for move. Thus, the adoption response message serves as an acknowledgment of the move request from the non-target AP (e.g., $AP_3$ 430). On the other hand, for the target AP (e.g., $AP_2$ 420), the AP may vote against the requested client move. For example, because VBR is propagated periodically between APs in the AP cluster, the information may become stale. Specifically, the VBR information may have changed at $AP_2$ 420, but not yet updated at $AP_1$ 410. Thus, based on the changed VBR information, $AP_2$ 420 may no longer be the best AP for the client to associate with. As another example, it is possible that multiple APs (e.g., both $AP_1$ 410 and $AP_3$ 430) initiate adoption request messages for multiple clients to move to $AP_2$ 420 during the same period of time. However, $AP_2$ 420 may not be able to accommodate all of the requested client moves. Therefore, $AP_2$ 420 may deny a subset of requested client moves in response to the number of requested client moves exceeds a threshold number. The threshold number may be dynamically adjusted based on a load at $AP_2$ 420.

In some embodiments, after $AP_2$ 420 transmits the adoption response message, $AP_2$ 420 will maintain a local record indicating that $AP_2$ 420 will accept $client_2$'s subsequent association request. Likewise, after AP3 430 transmits the adoption response message, $AP_3$ 430 will maintain a local record indicating that $AP_3$ 430 will deny $client_2$'s subsequent association request (because the target AP is $AP_2$ 420, not $AP_3$ 430).

D. Executing Decision

In the illustrated example here, because both $AP_2$ 420 and $AP_3$ 430 vote for the requested client move from $AP_1$ 410 to $AP_2$ 420, $AP_1$ 410 will proceed to execute the move decision. For example, $AP_1$ 410 can de-authorize $client_2$ that is currently associated with $AP_1$ 410. Because signals from $client_2$ can only be heard at $AP_1$ 410 and $AP_2$ 420, and $AP_1$ 410 has de-authorized $client_2$, $client_2$ will associate with $AP_2$ 420 subsequent to $AP_1$ 410 de-authorizes $client_2$. Note that, even if signals from $client_2$ could be heard at all three APs, $client_2$ will still associate with $AP_2$ 420 subsequent to $AP_1$ 410 de-authorizes $client_2$ because $AP_3$ maintains a local record indicating that $AP_3$ 430 will deny $client_2$'s subsequent association request. In some embodiments, instead of denying $client_2$'s subsequent association request, $AP_3$ 430 may opt not to respond to $client_2$'s subsequent association request.

After $client_2$ successfully associates with $AP_2$ 420, $AP_2$ 420 will broadcast an adoption done message with a flag set to indicate the success of the client move requested by $AP_1$ 410.

The adoption done message will be received by both $AP_1$ 410 and $AP_3$ 430, which will reset its local record regarding whether or not to access subsequent association request from $client_2$. On the other hand, if $client_2$ re-associates with $AP_1$ 410, $AP_1$ 410 will broadcast an adoption done message with a flag set to indicate the failure of the requested client move.

In some embodiments, $AP_1$ 410 may keep track of the number of re-association requests from $client_2$ after $AP_1$ 410 de-authorizes $client_2$. If the number of re-association requests exceeds a preconfigured threshold number, $AP_1$ 410 will accept the re-association request from $client_2$. For example, a network administrator may configure that an AP shall not receive more than 8 re-association requests within any period of 10 seconds or less. This is because $AP_1$ 410 can infer, from the persistent re-association requests, that $client_2$ has a strong preference to be associated with $AP_1$ 410. If $AP_1$ 410 continue denying re-association requests from $client_2$, $client_2$ may not be able to connect to the WLAN.

State Machine for Distributed Client Optimization

Figure 5:
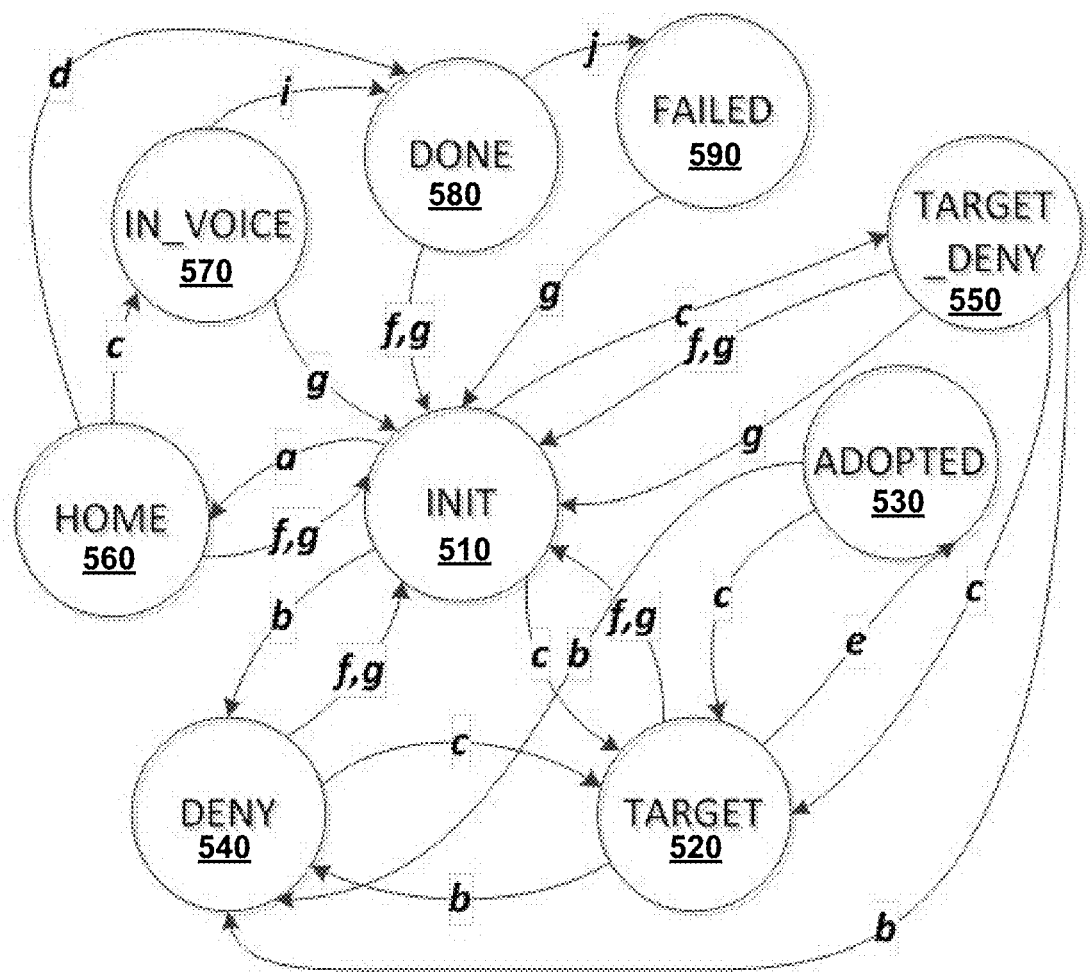
FIG. 5 illustrates an exemplary state machine according to embodiments of the present disclosure.

FIG. 5 illustrates an exemplary state machine according to embodiments of the present disclosure. FIG. 5 includes at least nine states, such as INIT 510, TARGET 520, ADOPTED 530, DENY 540, TARGET_DENY 550, HOME 560, IN_VOICE 570, DONE 580, FAILED 590, etc.

In addition, FIG. 5 also illustrates how a state can transit to another state. Specifically, state transition "a" indicates that an AP can initiate a adoption request to find a better AP for a client device. State transition "b" indicates that the AP has received the adoption request but is not the target AP for the requested move. State transition "c" indicates that the AP has received the adoption request and is identified as the target AP for the requested move. State transition "d" indicates that the AP has received adoption response from all APs and thus can de-authorize the client that is to be moved to the target AP. State transition "e" indicates that the target AP has agreed to the requested client move. State transition "f" indicates that the client has associated with the target AP successfully. State transition "g" indicates that the state has timed out. State transition "h" indicates that the client is on a voice call that shall not be interrupted. State transition "i" indicates that the client's voice call has ended. State transition "j" indicates that the client failed to associate with the target AP as expected (for example, as a "sticky" client that has a strong preference to re-associate with the initial AP).

Process for Distributed Client Optimization

Figure 6A:
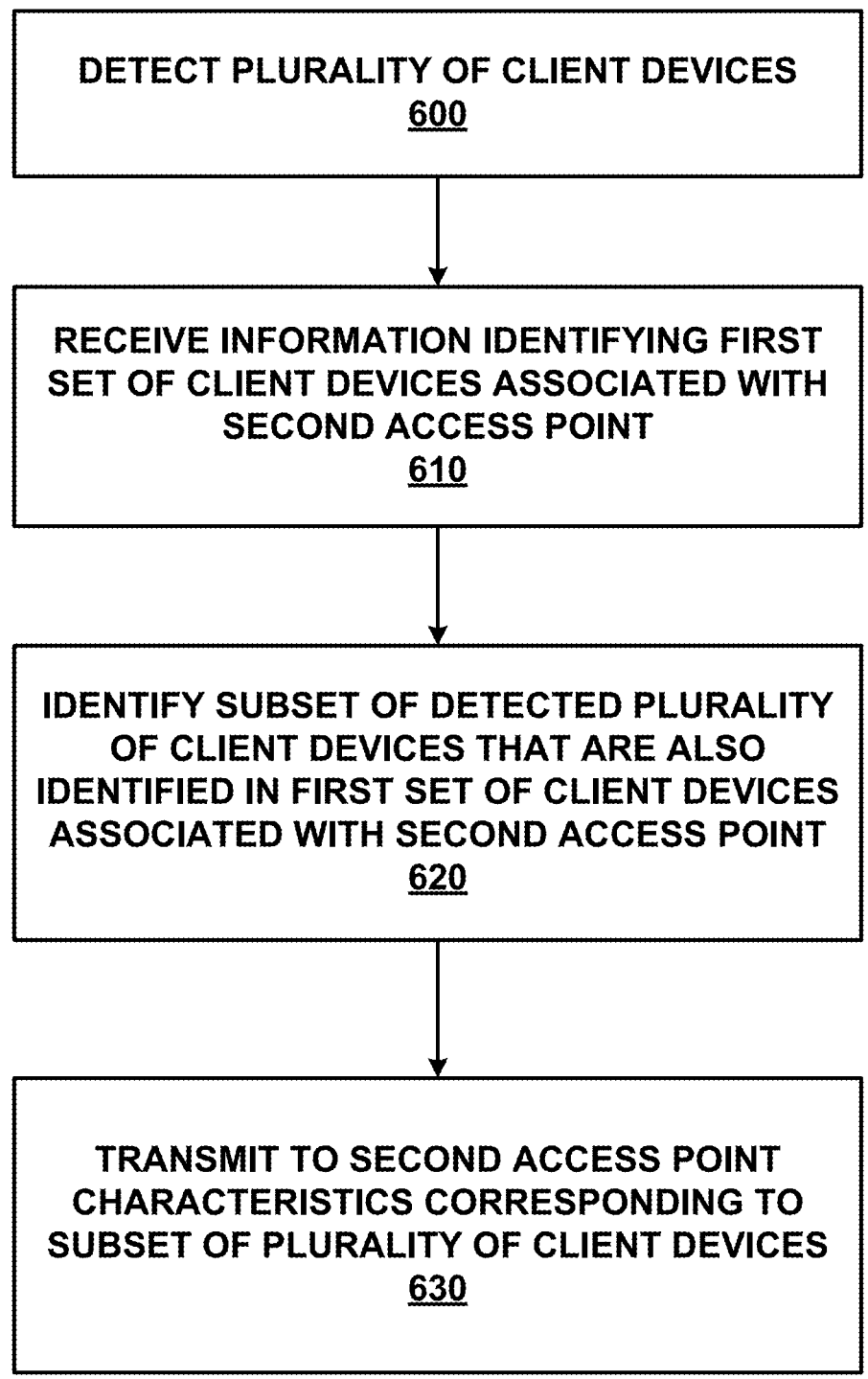
FIGS. 6A-6B illustrate an exemplary process for distributed client optimization according to embodiments of the present disclosure.

FIG. 6A illustrates an exemplary process for distributed client optimization according to embodiments of the present disclosure. During operations, a first access point detects a plurality of client devices (operation 600). The first access point then receives information identifying a first set of client devices associated with a second access point (operation 610), and further identifies a subset of the detected plurality of client devices that are also identified in the first set of client devices associated with the second access point (operation 620). Next, the first access point transmits to the second access point, characteristics corresponding to the subset of the plurality of client devices (operation 630). Note that, the characteristics can be determined based on wireless signals received by the first access point from the subset of the plurality of client devices.

In some embodiments, a second access point selects a particular access point for providing network access to a particular client device in the first set of client devices currently associated with the second access point based at least on the characteristics received by the second access point from the first access point.

In some embodiments, responsive to the selected particular access point being different than the second access point, the second access point can terminate the association between the particular client device and the second access point. In some embodiments, responsive to the selected particular access point being different than the second access point, the second access point can transmit a notification to the particular access point. The notification will indicate that the particular access point is selected for providing network access to the particular client device.

In some embodiments, the particular access point stores information identifying the particular client device as a client device to be served by the particular access point.

In some embodiments, the second access point will receive from the particular access point a confirmation accepting the particular client device as a client device to be served by the particular access point. In some embodiments, the second access point will receive from the particular access point a rejection declining the particular client device as a client device to be served by the particular access point.

In some embodiments, responsive to the second access point receiving the rejection from the particular access point, the second access point continues to provide network access to the particular client device.

In some embodiments, responsive to the second access point receiving the rejection from the particular access point, the second access point selects a third access point to provide network access to the particular client device. The second access point may further transmits a notification to a third access point indicating that the particular access point is selected for providing network access to the particular client device. Note that, the third access point is different than the particular access point. Therefore, the third access point will store information identifying the particular client device as a client device that is not to be served by the third access point.

In some embodiments, the first access point receives information identifying a second set of client devices detected by the second access point. Also, the first access point identifies a second subset of the detected plurality of client devices that are also identified in the second set of client devices detected by the second access point. Then, the first access point transmits to the second access point characteristics corresponding to the second subset of the plurality of client devices. Note that, the characteristics are determined based on wireless signals received by the first access point from the second subset of the plurality of client devices.

Figure 6B:
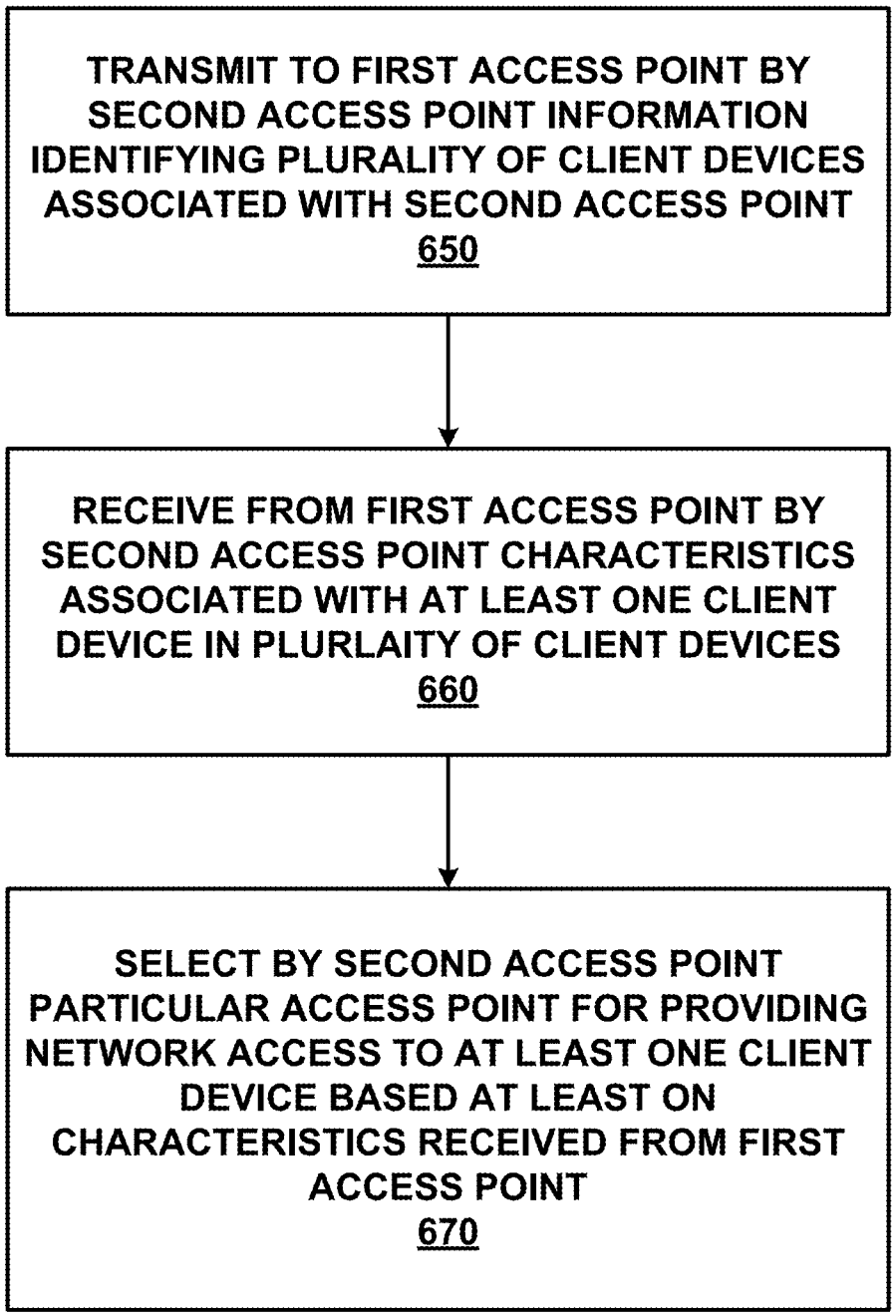

FIG. 6B illustrates another exemplary process for distributed client optimization according to embodiments of the present disclosure. During operations, a second access point transmits to a first access point information identifying a plurality of client devices associated with the second access point (operation 650). Further, the second access point may receive from the first access point characteristics associated with at least one client device in the plurality of client devices (operation 660). The characteristics are determined by the second access point based on wireless signals received by the second access point from the at least one client device. Then, the second access point selects a particular access point for providing network access to the at least one client device based at least on the characteristics received from the first access point (operation 670).

In some embodiments, the second access point further receives from the first access point characteristics associated with the first access point, and selects the particular access point based at least on the characteristics associated with the first access point. The characteristics associated with the second access point include one or more of: a wireless channel load, a channel interference level, a channel utilization rate, and a differentiated capability.

In some embodiments, the characteristics associated with the at least one client device include a number of times that the at least one client device has been triggered to be moved to another AP in the past.

In some embodiments, the characteristics associated with the at least one client device include a number of times that the at least one client device has been moved successfully to another AP in the past.

In some embodiments, the characteristics associated with the at least one client device include an application type associated with the at least one client device. Note that, the application type includes a voice application, a video application, and a data application, etc.

In some embodiments, the characteristics associated with the at least one client device include a device type associated with the at least one client device. Note that, the device type may include, but is not limited to, an Apple® device, an Android® device, and a Windows® device.

In some embodiments, the characteristics associated with the at least one client device include a platform type associated with the at least one client device. For example, the platform type can be a Java platform, a .NET platform, etc.

In some embodiments, the characteristics associated with the at least one client device include an operating system type associated with the at least one client device. For example, the operating system type may indicate a iOS operating system, a Windows operating system, a Linux operating system, etc.

In some embodiments, the characteristics associated with the at least one client device include an association status associated with the at least one client device. The association status may indicate whether the at least one client device is associated with an access point; which access point the at least one client device is associated with; whether an access point can hear signals transmitted from the at least one client device; etc.

In some embodiments, the characteristics associated with the at least one client device include a signal strength level associated with a wireless signal received by the at least one client device. The signal strength level may be indicated by a received signal strength indicator (RSSI) or a signal-to-noise ratio (SNR), or any other comparable wireless signal strength metrics.

System for Distributed Client Optimization

Figure 7:
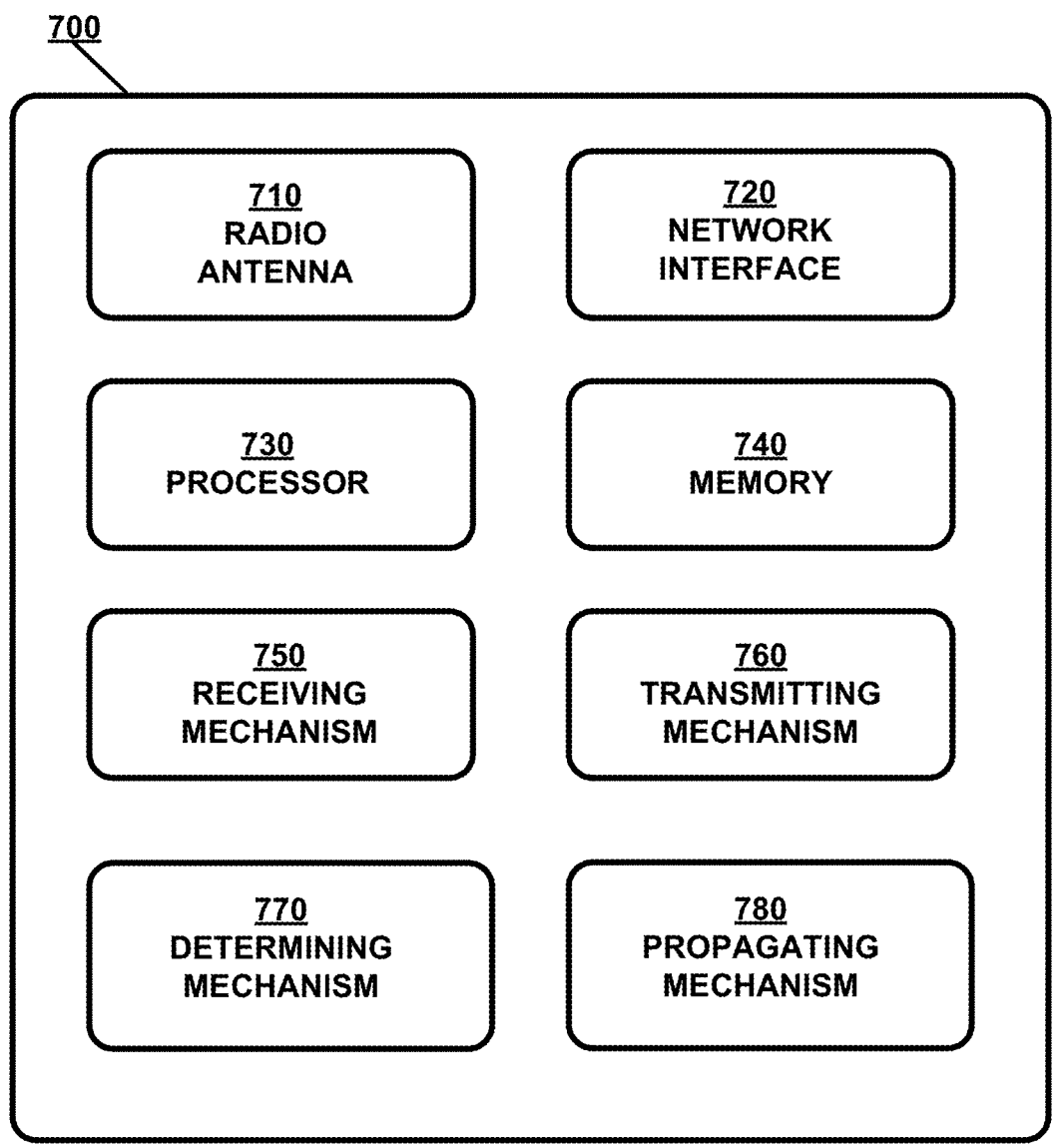
FIG. 7 is a block diagram illustrating an exemplary system for distributed client optimization according to embodiments of the present disclosure.

FIG. 7 is a block diagram illustrating a system for distributed client optimization according to embodiments of the present disclosure.

Network device 700 includes at least one or more radio antennas 710 capable of either transmitting or receiving radio signals or both, a network interface 720 capable of communicating to a wired or wireless network, a processor 730 capable of processing computing instructions, and a memory 740 capable of storing instructions and data. Moreover, network device 700 further includes a receiving mechanism 750, a transmitting mechanism 760, a determining mechanism 770, and a propagating mechanism 780, all of which are in communication with processor 730 and/or memory 740 in network device 700. Network device 700 may be used as a client system, or a server system, or may serve both as a client and a server in a distributed or a cloud computing environment.

Radio antenna 710 may be any combination of known or conventional electrical components for receipt of signaling, including but not limited to, transistors, capacitors, resistors, multiplexers, wiring, registers, diodes or any other electrical components known or later become known.

Network interface 720 can be any communication interface, which includes but is not limited to, a modem, token ring interface, Ethernet interface, wireless IEEE 802.11 interface, cellular wireless interface, satellite transmission interface, or any other interface for coupling network devices.

Processor 730 can include one or more microprocessors and/or network processors. Memory 740 can include storage components, such as, Dynamic Random Access Memory (DRAM), Static Random Access Memory (SRAM), etc.

Receiving mechanism 750 generally receives one or more network messages via network interface 720 or radio antenna 710 from a wireless client. The received network messages may include, but are not limited to, requests and/or responses, beacon frames, management frames, control path frames, and so on.

In some embodiments, receiving mechanism 750 of a first access point receives information identifying a first set of client devices associated with a second access point. Moreover, receiving mechanism 750 of the first access point can further receive information identifying a second set of client devices detected by the second access point.

In some embodiments, receiving mechanism 750 of a second access point receives, from a particular selected access point, a confirmation accepting the particular client device as a client device to be served by the particular access point. In some embodiments, receiving mechanism 750 of the second access point receives, from the particular access point, a rejection declining to accept the particular client device as a client device to be served by the particular access point.

In some embodiments, receiving mechanism 750 of the second access point receives from the first access point characteristics associated with at least one client device in the plurality of client devices. The characteristics can be determined by the second access point based on wireless signals received by the second access point from the at least one client device. In addition, receiving mechanism 750 of the second access point may receive from the first access point characteristics associated with the first access point.

Transmitting mechanism 760 generally transmits messages, which include, but are not limited to, requests and/or responses, beacon frames, management frames, control path frames, and so on.

In some embodiments, transmitting mechanism 760 of the first access point transmits, to the second access point, characteristics corresponding to the subset of the plurality of client devices. The characteristics can be determined based on wireless signals received by the first access point from the subset of the plurality of client devices. In some embodiments, transmitting mechanism 760 of the first access point transmits, to the second access point, characteristics corresponding to a second subset of the plurality of client devices. Here, the characteristics being determined based on wireless signals received by the first access point from the second subset of the plurality of client devices. Moreover, transmitting mechanism 760 of the second access point can transmit, to a first access point, information identifying a plurality of client devices associated with the second access point.

In some embodiments, responsive to the selected particular access point being different than the second access point, transmitting mechanism 760 of the second access point transmits a notification to the particular access point indicating that the particular access point is selected for providing network access to the particular client device. Also, transmitting mechanism 760 of the second access point can transmit a notification to a third access point indicating that the particular access point is selected for providing network access to the particular client device, whereas the third access point is different than the particular access point.

Determining mechanism 770 generally determines whether a particular client device shall be moved to associate with another access point in a WLAN. Specifically, determining mechanism 770 of the first access point can detect a plurality of client devices, and identify a subset of the detected plurality of client devices that are also identified in the first set of client devices associated with the second access point.

Based at least on the characteristics received by the second access point from the first access point, determining mechanism 770 of the second access point can select a particular access point for providing network access to a particular client device in a first set of client devices currently associated with the second access point. In some embodiments, responsive to the selected particular access point being different than the second access point, determining mechanism 770 can terminate the association between the particular client device and the second access point.

Responsive to the second access point receiving the rejection from the particular access point, determining mechanism 770 instruct the second access point to continue to provide network access to the particular client device. In some embodiments, responsive to the second access point receiving the rejection from the particular access point, determining mechanism 770 of the second access point selects a third access point to provide network access to the particular client device.

In some embodiments, determining mechanism 770 of the first access point identifies a second subset of the detected plurality of client devices that are also identified in the second set of client devices detected by the second access point. Further, determining mechanism 770 of the second access point can select a particular access point for providing network access to the at least one client device based at least on the characteristics received from the first access point. The characteristics associated with the at least one client device may include, for example, a number of times that the at least one client device has been triggered to be moved to another AP in the past; a number of times that the at least one client device has been moved successfully to another AP in the past; an application type associated with the at least one client device (e.g., a voice application, a video application, a data application, etc.); a device type associated with the at least one client device (e.g., an Apple® device, an Android® device, a Windows® device, etc.); a platform type associated with the at least one client device; an operating system type associated with the at least one client device; an association status associated with the at least one client device; a signal strength level associated with a wireless signal received by the at least one client device.

Note that, the selecting the particular access point can further be based on the characteristics associated with the first access point. Specifically, the characteristics associated with the second access point can be one or more of: a wireless channel load, a channel interference level, a channel utilization rate, a differentiated capability, etc.

Propagating mechanism 780 generally propagates client information (such as, a virtual beacon report (VBR)) or move decision to other access points within the same AP cluster. Specifically, propagating mechanism 780 can instruct transmitting mechanism 760 to transmit messages including client information and/or move decisions made by determining mechanism 770. In addition, propagating mechanism 780 of the particular access point instructs memory 740 to store information identifying the particular client device as a client device to be served by the particular access point. Likewise, propagating mechanism 780 of the third access point can store information identifying the particular client device as a client device that is not to be served by the third access point.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more hardware processors, causes performance of operations comprising:

detecting, by a first access point, a plurality of client devices;

receiving, by the first access point, information identifying a first set of client devices associated with the second access point;

identifying, by the first access point, a subset of the detected plurality of client devices that are also identified in the first set of client devices associated with the second access point;

transmitting, by the first access point to the second access point, characteristics corresponding to the subset of the plurality of client devices, the characteristics being determined based on wireless signals received by the first access point from the subset of the plurality of client devices.

2. The medium of claim 1, wherein the operations further comprise:

based at least on the characteristics received by the second access point from the first access point:

selecting, by the second access point, a particular access point for providing network access to a particular client device in the first set of client devices currently associated with the second access point.

3. The medium of claim 1, wherein the operations further comprise:

based at least on the characteristics received by the second access point from the first access point:

selecting, by the second access point, a particular access point for providing network access to a particular client device in the first set of client devices currently associated with the second access point;
responsive to the selected particular access point being different than the second access point: terminating the association between the particular client device and the second access point.

4. The medium of claim 1, wherein the operations further comprise:
based at least on the characteristics received by the second access point from the first access point:
selecting, by the second access point, a particular access point for providing network access to a particular client device in the first set of client devices currently associated with the second access point;
responsive to the selected particular access point being different than the second access point: transmitting a notification by the second access point to the particular access point indicating that the particular access point is selected for providing network access to the particular client device.

5. The medium of claim 4, wherein the operations further comprise the particular access point storing information identifying the particular client device as a client device to be served by the particular access point.

6. The medium of claim 4, wherein the operations further comprise receiving by the second access point from the particular access point, a confirmation accepting the particular client device as a client device to be served by the particular access point.

7. The medium of claim 4, wherein the operations further comprise:
receiving by the second access point from the particular access point, a rejection declining to accept the particular client device as a client device to be served by the particular access point;
responsive to the second access point receiving the rejection:
continuing, by the second access point, to provide network access to the particular client device; or
selecting, by the second access point, a third access point to provide network access to the particular client device.

8. The medium of claim 1, wherein the operations further comprise:
based at least on the characteristics received by the second access point from the first access point:
selecting, by the second access point, a particular access point for providing network access to a particular client device in the first set of client devices currently associated with the second access point;
transmitting a notification by the second access point to a third access point indicating that the particular access point is selected for providing network access to the particular client device, wherein the third access point is different than the particular access point;
storing, by the third access point, information identifying the particular client device as a client device that is not to be served by the third access point.

9. The medium of claim 1, wherein the operations further comprise:
receiving, by the first access point, information identifying a second set of client devices detected by the second access point;
identifying, by the first access point, a second subset of the detected plurality of client devices that are also identified in the second set of client devices detected by the second access point;
transmitting, by the first access point to the second access point, characteristics corresponding to the second subset of the plurality of client devices, the characteristics being determined based on wireless signals received by the first access point from the second subset of the plurality of client devices.

10. A non-transitory computer readable medium comprising instructions which, when executed by one or more hardware processors, causes performance of operations comprising:
transmitting, to a first access point by a second access point, information identifying a plurality of client devices associated with the second access point;
receiving, from the first access point by the second access point, characteristics associated with at least one client device in the plurality of client devices, the characteristics being determined by the second access point based on wireless signals received by the second access point from the at least one client device;
selecting, by the second access point, a particular access point for providing network access to the at least one client device based at least on the characteristics received from the first access point.

11. The medium of claim 10, wherein the operations further comprise:
receiving, from the first access point by the second access point, characteristics associated with the first access point;
wherein the selecting the particular access point is further based on the characteristics associated with the first access point.

12. The medium of claim 10, wherein the characteristics associated with the second access point comprise one or more of: a wireless channel load, a channel interference level, a channel utilization rate, and a differentiated capability.

13. The medium of claim 10, wherein the characteristics associated with the at least one client device comprise a number of times that the at least one client device has been triggered to be moved to another AP in the past.

14. The medium of claim 10, wherein the characteristics associated with the at least one client device comprise a number of times that the at least one client device has been moved successfully to another AP in the past.

15. The medium of claim 10, wherein the characteristics associated with the at least one client device comprise an application type associated with the at least one client device, wherein the application type comprises one or more of a voice application, a video application, and a data application.

16. The medium of claim 10, wherein the characteristics associated with the at least one client device comprise a device type associated with the at least one client device, wherein the device type comprises one or more of an Apple device, an Android device, and a Windows device.

17. The medium of claim 10, wherein the characteristics associated with the at least one client device comprise a platform type associated with the at least one client device.

18. The medium of claim 10, wherein the characteristics associated with the at least one client device comprise an operating system type associated with the at least one client device.

19. The medium of claim 10, wherein the characteristics associated with the at least one client device comprise an association status associated with the at least one client device.

20. The medium of claim 10, wherein the characteristics associated with the at least one client device comprise a signal strength level associated with a wireless signal received by the at least one client device.

* * * * *